US012298840B1

(12) United States Patent
Bhatia

(10) Patent No.: US 12,298,840 B1
(45) Date of Patent: May 13, 2025

(54) SKIP LEARNING FOR MULTIVARIATE ANOMALY DETECTION ON STREAMING DATA

(71) Applicant: Amazon Technologies, Inc., Seattle, WA (US)

(72) Inventor: Rajeev Rai Bhatia, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 17/991,726

(22) Filed: Nov. 21, 2022

(51) Int. Cl.
*G06F 11/00* (2006.01)
*G06F 11/07* (2006.01)
*G06N 20/20* (2019.01)

(52) U.S. Cl.
CPC ...... *G06F 11/0751* (2013.01); *G06F 11/0721* (2013.01); *G06N 20/20* (2019.01)

(58) Field of Classification Search
CPC ............................. G06F 11/0751; G06N 20/20
USPC ...................................................... 714/1–57
See application file for complete search history.

(56) References Cited

U.S. PATENT DOCUMENTS

| | | | | |
|---|---|---|---|---|
| 2018/0349323 | A1* | 12/2018 | Borra | G06N 3/084 |
| 2020/0341987 | A1* | 10/2020 | Wright | G06N 20/00 |
| 2021/0097479 | A1* | 4/2021 | Saffar | G06Q 30/0637 |
| 2023/0164035 | A1* | 5/2023 | Nagar | G06N 3/02 |
| | | | | 714/37 |

* cited by examiner

*Primary Examiner* — Sarai E Butler
(74) *Attorney, Agent, or Firm* — Davis Wright Tremaine LLP

(57) ABSTRACT

Systems and methods are described for detecting anomalies within time series data using one or more online machine learning models. In one example, time series data may be obtained that spans a moving time period of a set length, to be used as training data. A machine learning model may be trained using the training data to identify anomalies in the time series data by upon detecting an estimation of an anomalous value in the time series data, pausing input of additional values of the training data into the machine learning model, and resuming input of the additional values of the training data into the machine learning model based on detecting at least one non-anomalous value. The trained machine learning model may then be used to detect a first anomaly in additional time series data by comparing the at least one additional value to the trained machine learning model.

20 Claims, 10 Drawing Sheets

SKIP LEARNING FOR MULTIVARIATE ANOMALY DETECTION ON STREAMING DATA

BACKGROUND

Anomaly detection is becoming increasing important, particularly given the increasingly reliance on sensors and other data sources to monitor complex systems. Anomaly detection for multivariate time-series data that includes multiple input sources, such as sensors, gathering data over time, task is of huge importance for both applied machine learning research and data mining for industrial applications. Recent advancements have achieved significant progress on this topic, however there are several limitations; specifically in the ability to apply to online streaming setting to monitor system-level health, using telemetry from thousands of sensors and equipment devices using scalable low-latency models. In addition, most approaches do not capture and explain relationships between different time-series data leading to unavoidable false-alarms and lower than expected alarm precision and recall.

BRIEF DESCRIPTION OF THE DRAWINGS

Various techniques will be described with reference to the drawings, in which.

DETAILED DESCRIPTION

Figure 1:
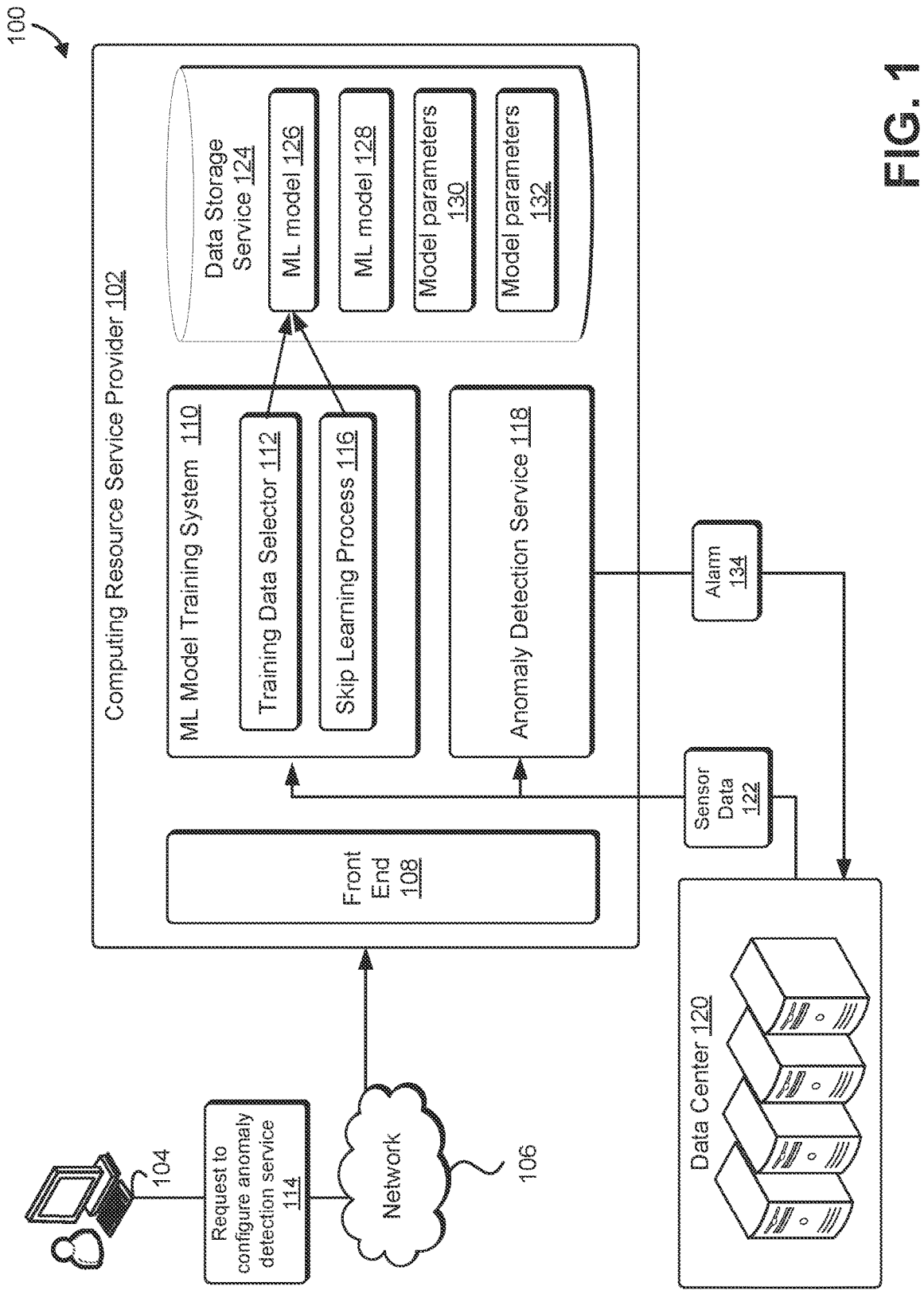
FIG. 1 illustrates an example environment in which the described techniques can be practiced, according to at least one embodiment.

Various systems and methods are described herein relating to using machine learning techniques to detect anomalies in time series streaming data, such as multivariate time series data. In some aspects, a method for training one or more machine learning models may utilize a skip learning approach, whereby data that is indicative or estimated to be anomalous, may be skipped or not entered as training data for the machine learning model. In some cases, estimating an anomalous value in the data may include determining a rolling median absolute deviation for a given time window. In this way, when utilized with machine learning models that do not actually use anomalous values to learn the anomalous region when identifying anomalous values, such as tree-based ensemble models including isolation forest, etc., training accuracy may be increased with the same amount of in some cases less training data from a continuous stream of time-series. In some cases, techniques may also be provided that split time series data into windows of a set or determined length, and periodically update the training data when new time series data spanning the length of the window is obtained. In some cases, this may include using a rolling window implementation where an oldest window of data may be dropped, and a new window of data added, to the data that is used to training a given machine learning model, such as to detect anomalies.

The described systems and techniques may include a Multivariate Anomaly Detection (MVAD) approach for low-latency time-series data, using Isolation Median Absolute Deviation Forests with explainability (IMFx) realized via an online Machine Learning (ML) framework, that allows small footprint batch models to continuously learn and predict in a streaming setting. The MVAD-IMFx algorithm is a novel approach which ingests several univariate time-series in a single model to learn the complex inter-dependencies combining tree-based Isolation Forests or other tree-based ensemble models and Rolling Median Absolute Deviation methods—to provide Top N metric tracking to assist in anomaly root cause triaging. In addition, thee described approach may leverage an innovative skip learning technique that helps improve anomaly detection accuracy and optimize overall performance of the online ML task on production.

In some examples, a method for training a machine learning model and using the machine learning model to detect anomalies in time series data may include obtaining time series data spanning a moving time period to be used as training data, where the time series data includes values from at least one or more different sensors or data sources generated periodically for the moving time period. In some cases, the moving time period may be divided into a plurality of time windows each having a first length. In some cases, the training data may be collected and may spanning multiple time windows. Upon obtaining additional time series data spanning the first length, the additional time series data may be added to the training data, whereby the oldest time series data spanning a time window in the set of training data may be removed. The training data may then be used to train a machine learning (ML) model, such as a tree-based ensemble or isolation forest model. In cases, training the ML model may include detecting an anomaly in the time series data corresponding to a first time period, pausing the training, by not entering additional values corresponding to a number of periods after the first time period into the ML model, and resuming training the by entering additional values corresponding to at least one period after the number of periods has elapsed. This process of identifying or estimating an anomalous value and not using at least the anomalous value for training the ML model may be referred to herein as skip learning. In some cases, the method may further include obtaining additional time series and using the trained ML machine learning model to detect anomalies in the additional time series data.

In some cases, detecting or estimating the anomaly in the time series data for training may include determining a rolling median absolute deviation for the given time window, and comparing values in the data to the rolling median absolute deviation to detect the anomaly in the training data. In some cases, the time series data may include values that span multiple variables, such as may correspond to outputs from different sensors, different types of sensors, or other various data sources. In some cases, a single ML model may be training and subsequently used to detect anomalies across any or multiple of the multiple input variables. In these cases, different variables model in the ML model may be weighted differently to account for a variety of configurable definitions of an anomaly.

In a specific example, the time series data may include values from at least two different sensors or data sources corresponding to temperature values or various computing devices or other devices of a data center. In this example, an isolation forest machine learning model may be trained using the training data to detect heat events that are likely to cause damage to at least one of the computing devices. In various examples, once an anomaly is detected, an alarm or performance of a further action to mitigate the anomaly may be initiated.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: 1) more robust and efficient anomaly detection in time series data by utilizing a skip learning technique that requires less resource intensive training to exceed performance or more resource intensive techniques, 2) more resource efficient machine learning model training; and 3) other benefits and advantages that are described throughout this disclosure.

FIG. 1 illustrates an example environment 100 in which an ML model training system or service 110 and an anomaly detection service 112 may be provided by a computing resource service provider 102. A client 104 may interact with the computing resource service provider 102 via a front end 108 of computing resource service provider 102 over one or more networks 106 to interact with various data and services, such as through one or more of a model training system or service 110, an anomaly detection service 118, a data storage service 124, and/or other services, as will be described in greater detail below.

Client 104 may refer to a client computer system or computing device connected to a server (e.g., computing resource service provider) over a network 106. In some cases, client 104 refers to a user or operator of a client computer system, and may be an employee of an organization that utilizes a computing resource service provider 102 to interact with various forms of data, such as through one or more of a model training system 110, an anomaly detection service 118, and/or a data storage service 118.

Client 104 may submit a request 114 to access or interact to various computing resources (e.g., services or computing resources thereof) of computing resource service provider 102. The request 114, in some examples, is a web service application programming interface request (also referred to simply as a web service request), may be received by a service of the computing resource service provider 102. As illustrated, the client 104 may submit a request 114 to access or monitor or configure an anomaly detection service 118. The request 114 may be directed to one or more services provided by the computing resource service provider 102 and may include a request to access data and anomaly data relating thereto a model training system 110, an anomaly detection service 118, or a data storage service 124. In some cases, the request 114 may include anomaly data for configuring the anomaly detection service 118 to detect certain types or characteristics of anomalies, and/or identification of certain data to monitored for the detection of anomalies.

In some examples, request 114 may include one or more of: an indication of a source of time series data to evaluate, a location of where to put detected anomalies, an indication of what users are allowed to provide feedback, an initial configuration (such as sensitivity, indication of what is or is not of interest as anomalies, thresholds, etc.), what type of anomaly to detect, when to present an anomaly, an indication of who is to receive anomalies or indications of their existence, a namespace that includes the metric, a period for evaluation, a statistic or percentile to use, data points to alarm and/or provide an anomaly indication, an indication of treatment of missing data (treat as acceptable, ignore, treat as unacceptable, etc.), etc., and/or one or more actions to be performed in response to detecting an anomaly.

In some cases, the front end 108 may receive the request and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and to process them according to one or more policies associated with the service. In at least one embodiment, client 104 uses client software that is configured to establish a client-server relationship with a service of a computing resource service provider 102. A client 104 may connect to a service via front end 108, which receives requests from clients and routes them to backend services. Front end 108 may interface with one or more of a metrics service 110, an anomaly detection service 112, a data storage service 118, and/or other services 122 offered by a computing resource service provider 102 to its customers. In at least one embodiment, client 104 interacts with a GUI to interact with various media provided by or through the computing resource service provider 102, and client-side software translates the GUI setup to a web service API request which is transmitted from the client computer system 104 to front end 108 via a network 106. In an embodiment, the network 106 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described below in reference to FIG. 11. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide one or more of a model training system 110, an anomaly detection service 118, and/or a data storage service 124. Each of these services may provide ways for a customer to interact with various forms of data, including using the one or more services to detect anomalies in the data.

As illustrated, the ML model training system or service 110 may train one or more machine learning models 126, 128, which may be stored and/or access via a data storage service 124. The ML model training system 110 may obtain data for training from various sources, such as in the form of sensor data 122 from a data center 120. The sensor data 122 may include various values from different sensors or data sources (herein collectively referred to as multivariant data sources). In some cases, the sensor data 122 may include values that are generated, gathered, and/or transmitted periodically (e.g., every 30 seconds, 1, 2, 5, 10, 30, minutes, 1, 2, 6, 12, 24 hours, or measured on a weekly basis etc.), herein referred to as time series data. In other examples, the time series data may be obtained from a different service, or from data storage, such as data storage service 124, or any of a variety of facilities or systems that could benefit from real time or near real time monitoring of various detectable values that may indicate proper or improper operation, such as in the realm of manufacturing, material handling, packaging, shipping, various control systems for a variety of applications, etc.

In some cases, the ML model training system 110 may include a training data selector component or process 112, which may select portions of the sensor data 122 or other data, to be used to train one or more ML models 126, 128. In some aspects, the training data selector 112 may group the time series training data into a number of windows of a set (e.g., the same) length, such that the data contained in each window spans a first length of time. In some specific examples, the length of time may include a length of time spanning a number of periods, such as 65 minutes. In some cases, the training data selector 112 may compile incoming data, such as in a temporary memory store or buffer, and once the data reaches a certain length of time, the training data selector 112 may add the window of data to a set of training data. The training data selector 112 may also remove the oldest window of data in the training data set, such that the training data set always equals the same length of data (e.g., data spanning the same length of time). In some cases, the training data set may span a number of time windows, such as may be selected based on various attributes of the data, past performance in training, and so on. In one specific example, the training data set may span 4 time windows. In this way, the training data selector 112 may receive, compile, and group the time series data for training pone or more ML models in a rolling window fashion.

In the cases, the ML model training system 110 may also include a skip learning process or component 116. The skip learning process 116 may detect or estimate anomalous values for the time series data. In some cases, skip learning process 116 may determine or estimate an anomalous value threshold for a given time period of data, such that the values that meet or exceed the estimated threshold may be flagged as anomalous. Once a value is flagged as anomalous, the skip learning process 116 may pause or otherwise prevent the anomalous value or values, and in some cases, values falling after the anomalous value, from being used as training data for a given ML model. The skip learning process 116 may be particular useful when used with tree-based ensemble or other similar ML models, including isolation forest and other such models that do not rely on detecting prior anomalous values to determine a future anomalous value after the assumed contamination factor or percentage of anomalies in the model is met. These and other similar models may instead rely on normal or nominal values to determine a range of normal values, whereby values that are too distant from these values would be flagged or labeled as anomalous.

In some cases, the ML model training system 110 may utilize the training data selector 112 and/or the skip learning process 116 to train one or more ML models 126, 128, which may then be utilized by an anomaly detection service 118 to detect anomalies for a given system or facility, such as data center 122. The ML model training system 110 may, in some cases, utilize various parameters or collections of parameters, such as parameters 130, 132, to training models 126, 128 to detect specific anomalies from various data sources. As will be described in further examples below, in some cases these parameters may include one or more values, such as may define normal operating conditions or values, or vice versa, abnormal conditions or values that should trigger an alarm or be deemed anomalous. In yet some cases, model parameters 130 and/or 132 may define characteristics of the model itself, as will be described in greater detail below.

In some aspects, the anomaly detection service 118 may be a collection of computing resources configured to analyze data, such as obtained and/or monitored from a data source, such as data center 120, on behalf of a customer 104 to detect anomalies within that data. In some aspects, the anomaly detection service 118 may generate or access one or more models, such as machine learning models 126, 128, neural networks, etc., generated by the ML model training system 110 to be used in detecting anomalies within data 122 originating from a data source 120. In some cases, the anomaly detection service 118 may interact with the ML model training system 110 and/or any of a variety of other services, such as may be provided by the computing resource service provider 102, to detect anomalies within various data of interest. In some cases, a data source (not illustrated) may reside in another service, such that the anomaly detection service 118 may receive data from the other service for analysis. In yet some cases, the anomaly detection service 118 may obtain metrics or other metadata of certain customer data, from another service to be used in detecting anomalies within the data of interest. In other examples, the anomaly detection service 118 may obtain data from a data source external to the computing resource service provider 102.

In some aspects, the anomaly detection service 118 (via appropriately configured and authenticated API calls) may provision and/or access virtual computer systems that are instantiated on physical computing devices hosted and operated by the computing resource service provider 102. The virtual computer systems may be used for various purposes, such as to operate as servers supporting data storage for a customer coupled with compute capabilities to search, query, access, and perform other operations on the customer data, such as to aid in creating models, and detecting anomalies or anomalous behavior within that data.

The anomaly detection service 112 may be configured to detect one or more anomalies within a data source, such as data source 120 across one or multiple metrics, dimensions, or values. In some aspects, the anomaly detection service 118 may be configured to detect specific types or classes of anomalies, such as across one or multiple specific metrics. In other examples the anomaly detection service 118 may be configured to detect a variety of different types of anomalies across a wide variety of dimensions or metrics. In some cases, anomaly detection service 118 may monitor REST APIs, URLs, and website content, checking for unauthorized changes from phishing, code injection and cross-site scripting, and various other indications of events recorded by one or more applications, services, etc. Anomaly detection service 118 may monitor detect anomalies within a data source 120 with or without modifying the data in the data sources 120.

Based on the time series data to evaluate, the anomaly detection service 118 may select one or more models to use in detecting anomalies within data. Types of anomalies and alarms differ between types of values or metrics, types of applications, etc. Annotating anomalies with types allow for the flexibility to pick the right type of anomalies based on the metric and/or user feedback. User feedback and unique metric requirements are used to adjust what model is used (for example, based on an annotation of a data set, anomaly, etc.), retrain a model, set different thresholds for reporting, etc. For example, user feedback may be used to: adjust importance of an anomaly or insight of the anomaly, adjust what type of anomalies are used to create an insight for a metric, etc. For example, if a user gives feedback that seasonal anomalies are not useful for a certain metric, those anomalies are muted. To get better feedback, the type of anomaly is used to generate explanations which are shown the user. For example, if the anomaly is due to trend changes, the user may be shown the explanation of how the trend changed. Domain knowledge may be used to annotate metrics and select which models are used by the anomaly detection service 118 to create anomalies and rules used for threshold-based anomalies. Domain knowledge may also be used to determine when to alarm on an anomaly.

In some examples, the computing resource service provider 102 may provide data storage through a data storage service 124 to store and manage large volumes of data, including image and other media data. In some cases, the data storage service 124 may interact with anomaly detection service 118 and/or the model training system 110 to enable detection and/or generation of metrics relevant to data stored by the data storage service 124. Data storage service 124 may be an on-demand data storage service, such as an object-based data storage service, and may be configured to store various forms of media. The data storage service 124 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein.

In some examples, data stored in the data storage service 124 may be organized into data objects, in one or more logical data containers. The data storage service 124 and/or the data source 120/sensor data 122 may include one or more data objects, which may have arbitrary sizes and may, in some instances, have constraints on size. Thus, the data storage service 124 may store numerous data objects of varying sizes. The data storage service 124 may operate as a key value store that associates data objects with identifiers of the data objects which may be used by the client 104 to retrieve or perform other operations in connection with the data objects stored by the data storage service 124. Access to the object-based data storage service 124 may be through application programming interface (API) calls to the service or via an interface, such as a graphical user interface (GUI).

In some aspects, data source 120 may include data obtained from a specific application or service, such as virtual computing resources including virtual machines, containers, etc., data storage services, and other services or entities running within or outside of the computing resource service provider. The data source 120 may include various values corresponding to a number of different variables or metrics gathered by various sources, including sensors, and other automatically generated or gathered values.

In some cases, the data storage service 124 may operate as a key value store that associates data objects with identifiers of the data objects which may be used by the client 104 to retrieve or perform other operations in connection with the data objects stored by the data storage service 124. Access to the data storage service 124 may be through application programming interface (API) calls to the service, for example from either directly from client 104, or via the computing resource service provider 102. It should be appreciated that the data storage service 124 may additionally or alternatively provide non-object based data storage, such as block data storage, table-oriented data storage, relational databases, file-based storage, and the like. The data storage service 124 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

In one example operation of model training system 110 and anomaly detection service 118, the computing resource service provider 102 may receive a request 114 to configure detection of anomalies within data 122 received from data source 122 through a network 106. The front end 108 of provider 102, responsive to the request 114, may process and store various model parameters 130, 132 for training one or more ML models 126, 128. The model training system 110 may, via the techniques herein, train the one or more models using training data indicated in the request 114, such as data 122 from data source 120. In some aspects, upon obtaining a threshold amount of training data, the model training system 110/front end 108 may indicate to the anomaly detection service 118 that the model is trained and ready for use. The anomaly detection service 118 may subsequently receive the time series data 122 periodically from data source and run the data through the one or more models to detect anomalies within the data 122. In some cases, the anomaly detection service 118 may be configured to trigger one or more actions, such as sending an alert or alarm 134 to user device 104 (not shown) and/or to a computing device associated with the data source itself 120, or initiating a mitigation action, in response to detecting one or a combination of anomalous values. In some cases, the alarm conditions and/or specification, and/or the mitigation actions may be configured via data contained in request 114.

Figure 2:
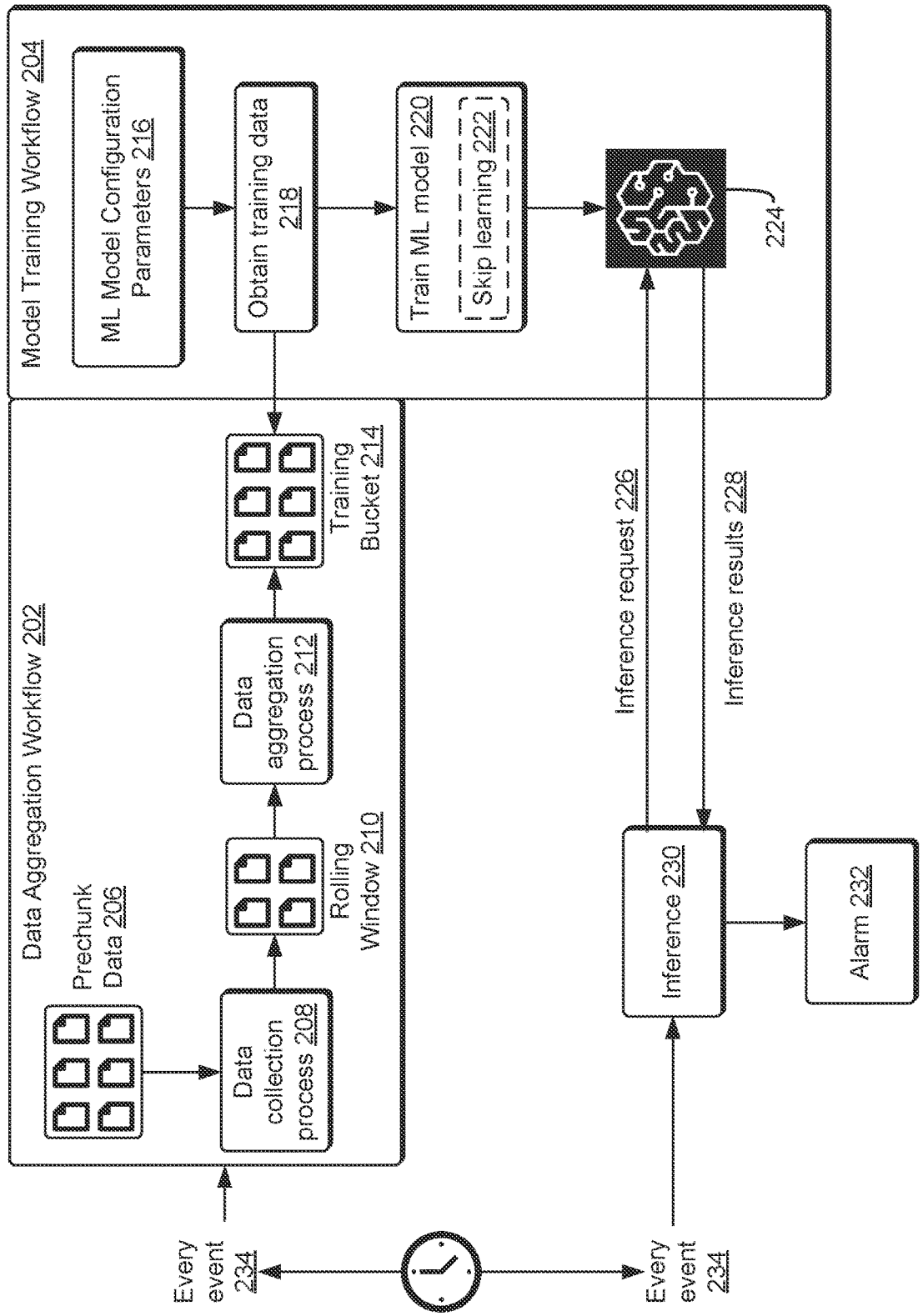
FIG. 2 illustrates an example process for training a machine learning model and using that machine learning model to detect anomalies in time series data, according to at least one embodiment.

FIG. 2 illustrates an example process 200 for training a machine learning model and using that machine learning model to detect anomalies in time series data. In some aspects, process 200 may be performed by the ML model training system 110, and/or the training data selector 112 and the skip learning process 116, and/or the anomaly detection service 118, as described above in reference to FIG. 1.

As illustrated, process 300 may begin with data aggregation workflow 202, in which time series data may be obtained, chunked or grouped, and stored in training bucket 214. In some aspects, data aggregation workflow 202 may be performed by the data training data selector 112 described above in reference to FIG. 1. In some cases, pre-existing and other training data may be pre-chunked, such as represented by pre chunk data 206. A data collection process 208 may obtain the pre chunk data 206 once it has reached a certain length of time or number of events and place it in the rolling window 210. In some cases, new events or values 234 from a data source, such as data source 120 described above in reference to FIG. 1 may be obtained and chunked into groups and stored as pre-chunk data. In some aspects, the new values or events may be obtained periodically, such as every minute. The data collection process 208 may collect data until a threshold amount of data for training the model, such as may be defined by a number of events or a time that the number of events correlate to. In one example, a rolling window 210, may be defined as a number of events or time-steps, such as 64 events or time-steps, such that once the data collection process 208 has compiled data for 64 events or time-steps, it may pass those events or time-steps, labeled a rolling window, to the data aggregation process 212. The data aggregation process may collect data corresponding to a number of different windows. In some cases, the data aggregation process 212 may add a new rolling window to the training bucket 214, once a complete window has been collected. In addition, the data aggregation process 212 may then remove an oldest rolling window form the training bucket 214. In some cases, the training bucket 214 may be configured to include a certain number of rolling windows, such as 4.

In one example a job may be scheduled to trigger an event every minute, such as illustrated as event 236, whereby only after the first 256 minutes (or other configurable time period or time step) is there enough data to train the model for the first time. Since the input data is pre-existing, the system will start as though the first 256 minutes have already passed. The training workflow 202 is triggered once every 64 minutes (or events 234), eventually replacing the older trained artifact by the newly trained artifact or ML model. As illustrated, inferences 230 may be made every minute after the model has been trained for the first time.

In some aspects, the training data may be pre-existing, and may be stored in a csv file, such that it contains 15 days' worth of data, such as with multiple dimensions, and in this example, 4 dimensions. This file may be pre-chunked and stored, for example, via a data storage service, such as service 124. A chunk in this example may be 256 data points each captured after a new 64 time step sliding window has been obtained, where each data point represents sensor or other data recorded at a given minute. The model may be trained on 4 dimensional time-series windows of data using a 256-time steps rolling window fashion. Every 64 minutes when there is a new chunk of data available, it is placed in the rolling window 210 and the oldest chunk is discarded. The latest 4-dimensional chunk may be stored as the 256 data point rolling window.

For training, in some examples, every 64 time-steps, the data collection process 208 takes the latest chunk from the pre-chunk data 206 and places it in the rolling window 210. These data points are then used to create a new Model Artifact or trained ML model 224 in the later steps. Adding the new data points triggers the data aggregate process 212, which vends the latest data points into the training bucket 214. From there, the model training workflow 204, which may also be performed, in some examples by the ML model training system 110 described above, may obtain the training data from training bucker 214, at operation 218 and use that data to training or retain an ML model at operation 220. In some cases, operation 220 may include utilizing skip learning 222, as will be described in greater detail below. In some cases, the model training workflow 204 may include obtaining one or more model parameters, such as from an ML model dashboard, at operation 216. In some cases, the ML model dashboard enables users to view the workflow in a graphical representation, such as to track their status of operations in real time.

In some cases, an inference 230 may be performed every event 236, whereby an inference engine or anomaly detections service, such as service 118, may process an inference request 226 by utilizing trained ML model 224, whereby any detections of one or more anomalies may be returned at operation 228, in which case, if an anomaly is detected or determined, an alarm 232 may be produced and/or provided to a user or another system to perform one or more mitigation actions.

Figure 3:
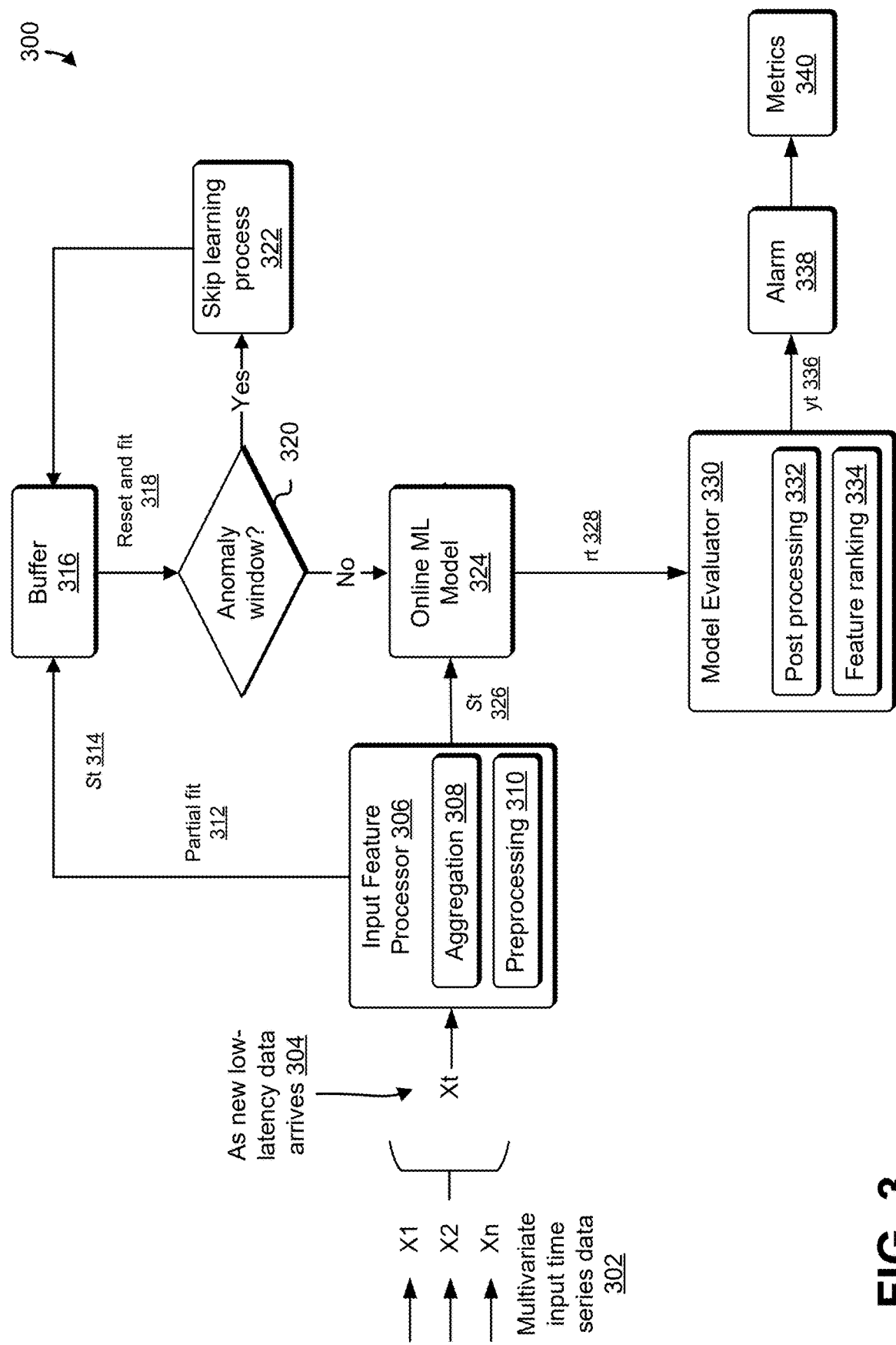
FIG. 3 illustrates an example process for training a machine learning model using skip learning and using that machine learning model to detect anomalies in time series data, according to at least one embodiment.

FIG. 3 illustrates an example process 300 for training a machine learning model using skip learning and using that machine learning model to detect anomalies in time series data, according to at least one embodiment. In some aspects, process 300 may be performed by the ML model training system 110, and/or the training data selector 112 and the skip learning process 116, and/or the anomaly detection service 118, as described above in reference to FIG. 1.

As illustrated in FIG. 3, multivariate time series data 302 may be obtained, at operation 304 by an input feature processor 306, which may be a collection of computing resources, or a process performed by computing resources. In some aspects, the input feature processes 306 may be part of the ML model training system 110 described above in reference to FIG. 1. An aggregation process 308 performed by the input feature processor 306 may aggregate the data into time windows for training purposes, as described herein, and preprocessing 310 may also be performed on the incoming data. Preprocessing 310 may include formatting the incoming data and/or performing other known modifications to the data to make it readily consumable by the online ML model 324.

For training the online or streaming ML model 324, the input feature processor 306 may aggregate the time series data into a sliding window 314 via storing the input data in a buffer 316, which may be an example of a multivariate ring buffer. As the data is processed and the ML model 324 is trained, an anomaly detection process or estimation process 320 may be performed, such that he values in the time series data are compared against one or more anomaly thresholds, if no anomalous are detected or estimated, at operation 320, then the data may be used to train to ML model 324. However, if one or a threshold number of anomalous values are detected, at operation 320, then skip learning process 322 may be performed, whereby the anomalous value or values and in some cases, a configurable amount or number of values after the anomalous value, may not be entered into ML model 324, as represented by the reset and fit operation 318.

For anomaly detection, as a new event or data is obtained by the input feature processor 306, it may be passed to the ML model 324 which may use the currently trained model to detect one or more anomalies in the new event data. The ML model 324 may output anomalies with rankings or other metadata, at 328, to a model evaluator 330, which may be a collection of computing resources configured to evaluate the output anomalies to a set of thresholds or other parameters, which may be set by a user or client. The model evaluator 330 may perform various processes, such as any of a variety of post processing 332 and/or feature ranking 334 to the anomalies that are output from the ML model 324. In some cases, the model evaluator 330 may determine that an alarm 336 should be triggered at operation 336. In yet some cases, compared to a Random Cut Forest (RCF) model that may consume 2-3 MB per model and requires incremental in memory training with every incoming data point, and requires thousands of (e.g., ~200 k in a large data center region) univariate rack models. In some cases, by leveraging the framework above, the number of models may be systematically reduced by a factor of ~1/50 (no. of racks/no. of aisles) by leveraging aisle-aggregated multivariate metrics as opposed to modeling rack-level univariate metrics AS illustrated in FIG. 3. each model 324 may also incorporates pre/post processing, safe-alarm suppression and opportunity to highlight potential root causes before they manifest into a large-scale event (LSE).

In some aspects, the described skip learning techniques may reduce the number of trainings (reducing computation/cost) required for streaming data at scale and helps improve the Area Under the Receiver Operating Characteristic Curve AUC-ROC metric (or F1 scores) representing accuracy of the underlying algorithm for the best performing model selected by users/customers. In some aspects, the described techniques may significantly decrease implementations costs, such that 4000 models, each consuming approximately 1 MB of memory, may be trained and used for approximately 90,0000 sensor inputs, whereas current techniques may require up to 200,000 models, each consuming 2-3 MB of memory per model.

In some examples, process 3400 and/or the techniques described herein may utilize the following algorithm:

---

Input:
  Window 1:    $X_1 = x_1, x_2, \ldots x_M$,
  Window 2:    $X_2 = X_{M-1}, x_{M-2}, \ldots x_{2M}$,
  Window M:    $X_M = x_{(N-1)M+1}, x_{(N-1)M+2}, \ldots x_{X2M}$
  $X_4 = \{x_1, x_2, \ldots, x_t, \ldots\}$ where $x_t \in R$ for $t \geq 1$
Output:
  Rt . . ., s: A list of Anomalies with ranks or scores
begin
  Preprocess each incoming datapoint ring-buffer using log-transform
  Compute the preliminary model using pre-train inputs in-memory and check-point model
  Partial Predict at each time step to detect Anomalous Points ($y_1$)
    Obtain the Rolling Median Absolute Deviation $$x_{anomaly} \text{ is detected when } \frac{|x_t - med_t x_t|}{MAD_n} > \text{anomaly threshold}$$

where,
    $X_t$ is the data point vector at time t and $x_{anomaly}$ is the anomalous point
      $MAD = b_t med_t |x_t - med_t x_t|$
      $med_t x_t$ is the sample median for the rolling window
    threshold is defined by the user during model selection
    b = 1.4826 is a scale factor that assumes normally distribution
  Partial Fit is the Isolation Forest Tree using a sliding window of pre-defined size.
    If anomalous window is dected (>a pre-defined time-steps)
      Skip learning, do not partial fit until normal point is detected for >b time-steps
  Posprocess anomaly scores using rolling standard deviation for predefined window size
  Inference Anomaly Output/Explainability
    Vend Anomalies and detection timestamp along with feature ranking in order of MAD
      scores ($f_1, f_2, \ldots f_g$)
    Explainability: If a contextual anomaly is detected, fit a Random Forest Regressor on
    rolling 256 time-steps followed by Decision Tree to explain multivariate model
    predictions.
end

--- the model evaluator 30 may output one or more e metrics 340 concerning the values that satisfied the anomaly criteria, and so on.

Figure 4:
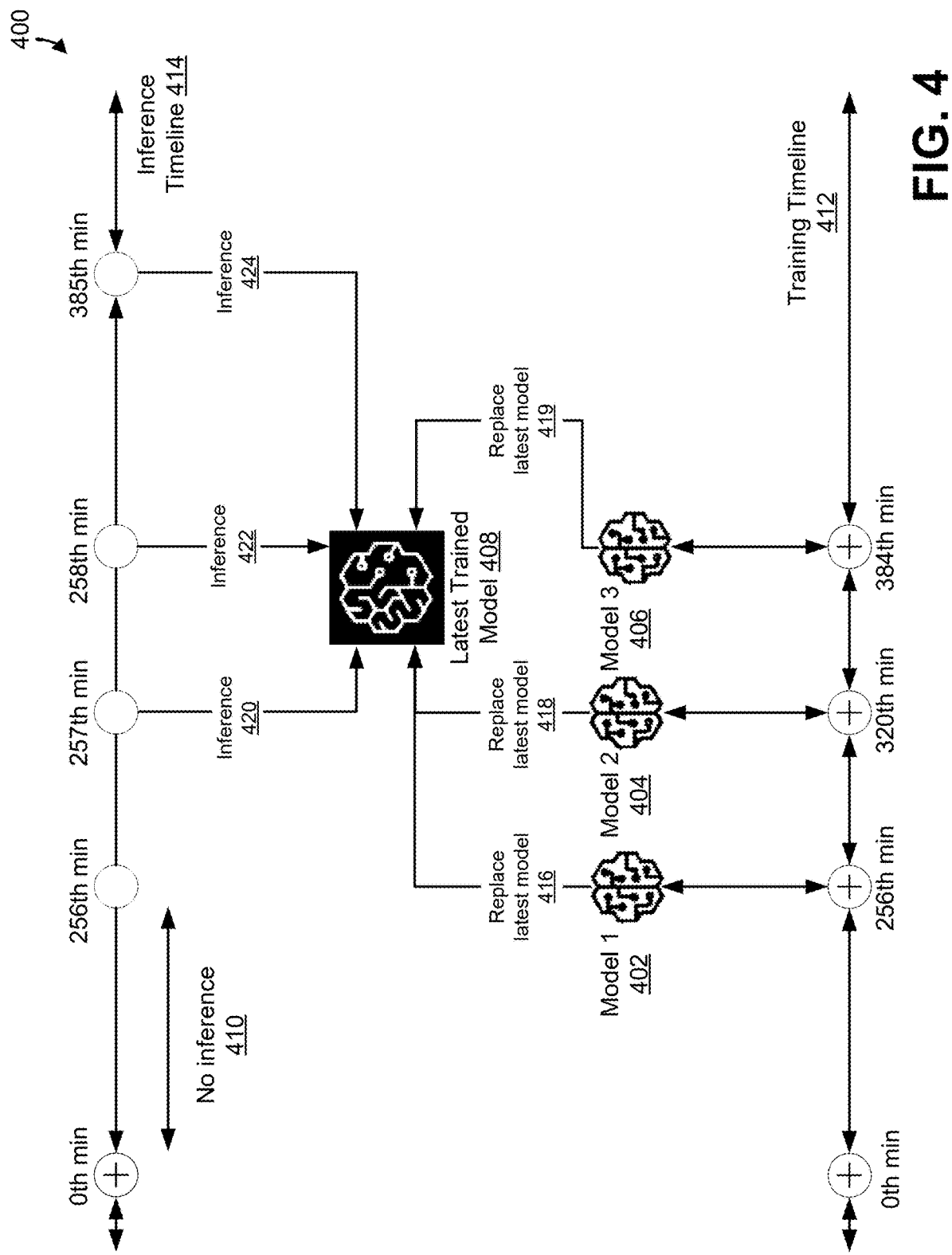
FIG. 4 illustrates an example process for training a machine learning model and using that machine learning model to make inferences, according to at least one embodiment.

In some aspects, the described MVAD-IMFx model may train via process 300 in the order of a few seconds for a pre-defined 256 pretrain size and may only needs to be re-trained once every 64 data points. In some examples, training the model may consumes about 1 MB per model, as FIG. 4 illustrates an example process 400 for training a machine learning model and using that machine learning model to make inferences, according to at least one embodiment. In some aspects, process 400 may be performed by the ML model training system 110, and/or the training data selector 112 and the skip learning process 116, and/or the anomaly detection service 118, as described above in reference to FIG. 1.

As illustrated in the specific example of FIG. 4, every 256 minutes (or time steps or periods) as represented on the training timeline 412, a new model may be trained, such as models 402, 404 and 406, with new data. Each time the data used to train the model completely changes, the newly trained model may replace the primary model or become the latest trained model 408, such as at operations 416, 418, and 419.

On the inference timeline 414, for the first 256 minutes during period 410, no inferences may be made. At minute 257, once the model has had enough input to train the latest model 408, an inference may be made on the data obtained at the 257 minute, at operation 420. Similarly, at minute 258 an inference may be made at 422, using model 1 402 as it would comprise the latest trained model 408. At minute 358 an inference can be made at 424, where model 3 406 would comprise the latest trained model 408. It should be appreciated that the time interval of the time series data (e.g., 1 minute or less) the training period of 256 minutes, and the rolling time period of 256 minutes are only given by way of example. Various other values may be used, such as based on empirical or other hyperparameters for selecting the best model from one or more models on a particular data set.

Figure 5:
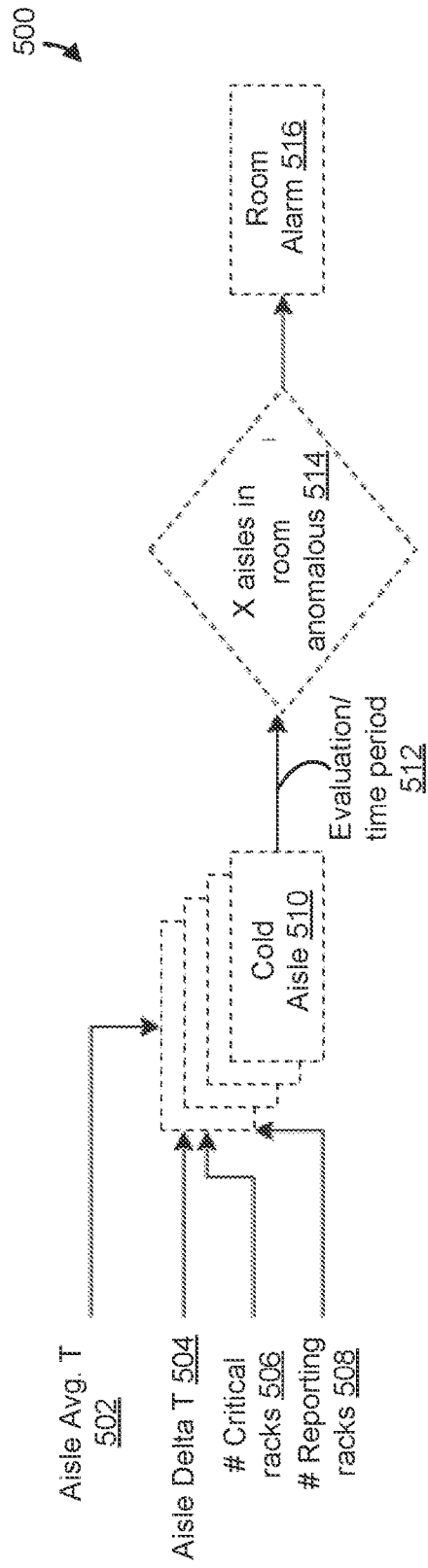
FIG. 5 illustrates an example process for using the described techniques to detect anomalies in a data center, according to at least one embodiment.

FIG. 5 illustrates an example process 500 for using the described techniques to detect anomalies in a data center, according to at least one embodiment. In some aspects, process 500 may be performed by the ML model training system 110, and/or the training data selector 112 and the skip learning process 116, and/or the anomaly detection service 118, as described above in reference to FIG. 1.

In the example illustrated, the time series data input to train an ML model may include data representing various metrics, such as average aisle temperature 502, aisle delta temperature 504, number of racks that are in critical condition of have critical temperature 506, and/or number of racks reporting temperature or other metric 508. This data may be obtained for a number of computing devices in a data center, such as data center 120 for example. Each of these piece variables may be collected for each aisle 510 or a number of aisles of computing devices in a data center. Once the data for each of these variables has been collected for a sufficient time window or evaluation period 512, the data may be analyzed/input into an ML model to determine if any of the aisles have anomalous data, at operation 514. If any aisles do have anomalous values, an alarm, such as alarm 516 may be generated, to warn operators of the data center and/or automated processes may take one or more mitigation actions to prevent any avoidable damage to the computing devise/facility.

Figure 6:
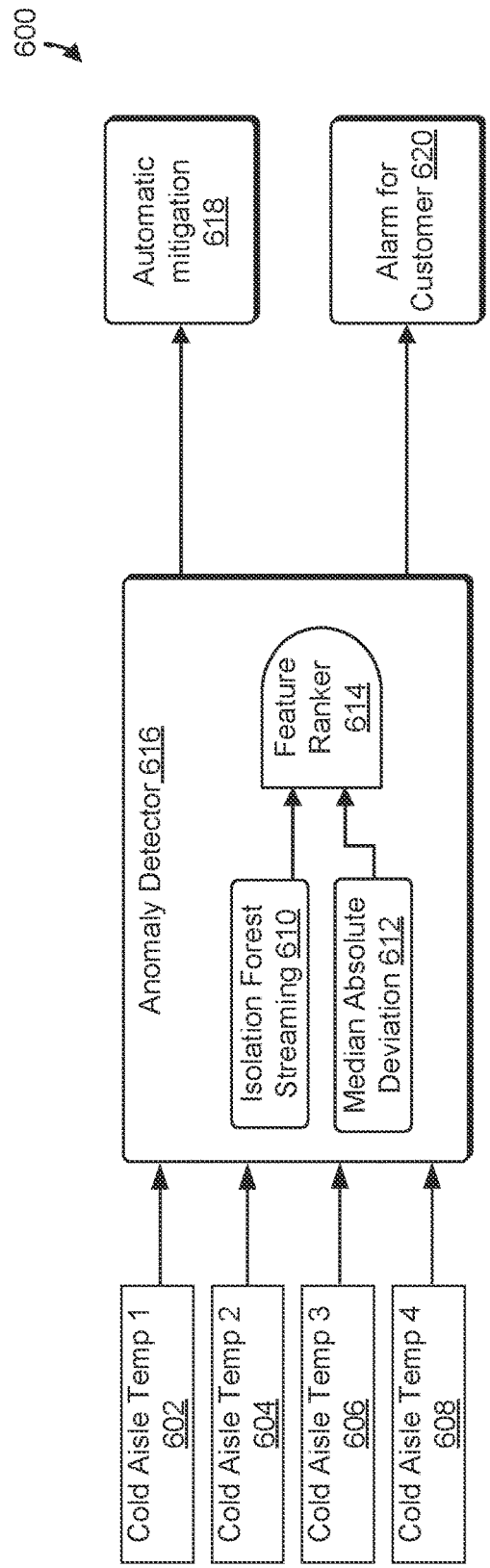
FIG. 6 illustrates another example process for using the described techniques to detect anomalies in a data center, according to at least one embodiment.

FIG. 6 illustrates another example process/system 600 for using the described techniques to detect anomalies in a data center, according to at least one embodiment. In some aspects, process 600 may be performed by the ML model training system 110, and/or the training data selector 112 and the skip learning process 116, and/or the anomaly detection service 118, as described above in reference to FIG. 1. In some aspects, anomaly detector may include one or more aspects of a trained ml model, such as may be trained by ml model training system 110 and anomaly detection service 118 descried above in reference to FIG. 1.

The anomaly detector may receive a number of different values or time series data, such as cold aisle temperature values 602-608 corresponding to the same aisle. In this example, the anomaly detector may execute three processes to evaluate the data, including an isolation forest streaming process to access a current trained model to analyze the data, a median absolute deviation 612 to be used to detect anomalies in the data, and a feature ranker to determine if one or more anomalies rises to the level of an alarm being triggered 620 or an automatic mitigation action being triggered at 618.

Figure 7:
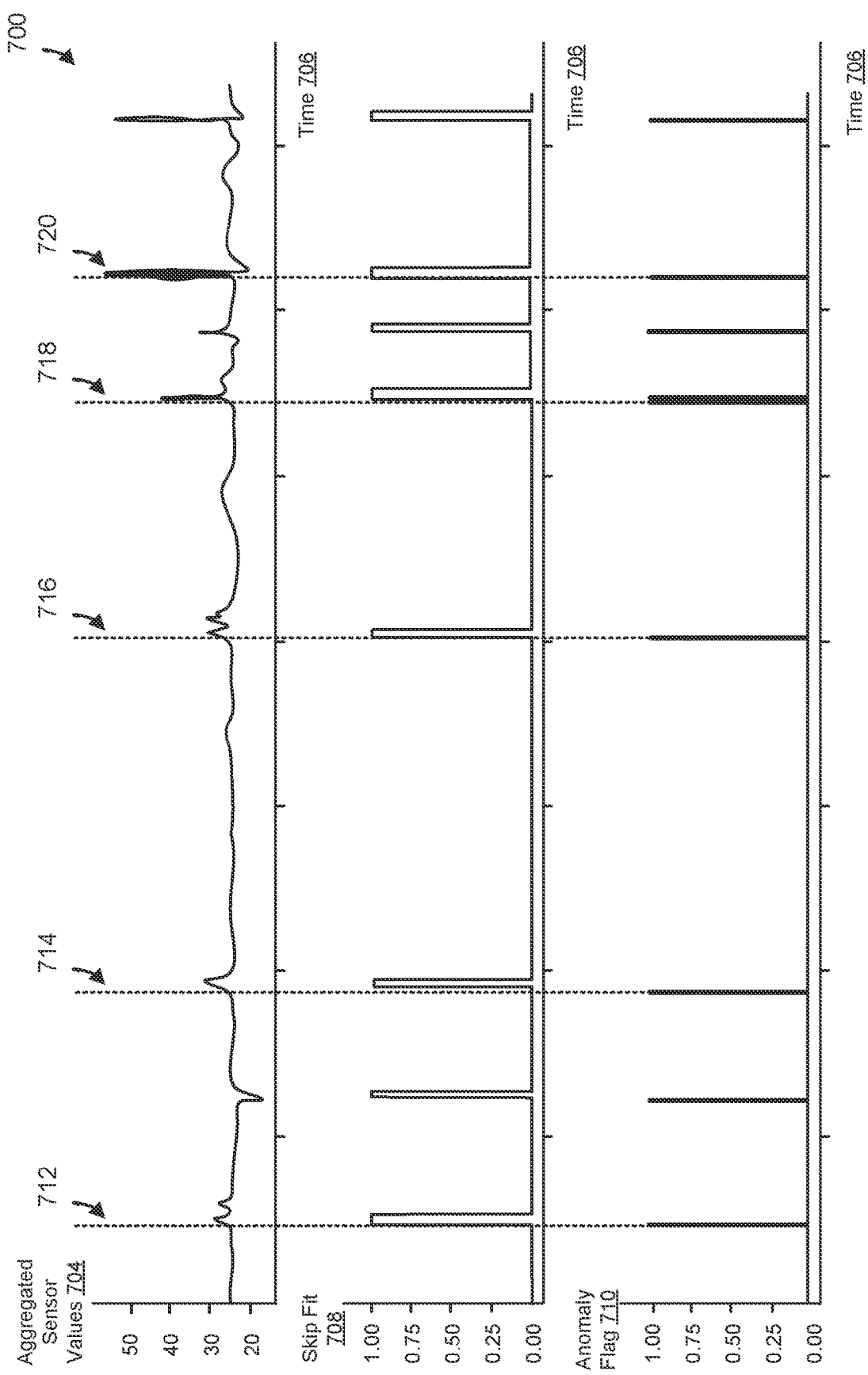
FIG. 7 illustrates an example timing diagram showing the correlation between time series data, skip learning, and anomalies detected within the time series data, according to at least one embodiment.

FIG. 7 illustrates an example timing diagram 700 showing the correlation between aggregated time series data 704, skip learning 708, and anomalies detected 710 within the time series data, over a time period 706. As illustrated, the correlation shows an example timing or triggering of skip learning (e.g., not inputting the sensor values 704 as training data into an ML model) based on spikes or dips in the aggregated sensor values, represented at times 712, 714, 716, 718, and 720. The lowest chart illustrated that in each of these cases an anomaly was flagged. In some of the examples, such as when multiple anomalies occur in succession, the skip learning or fit may last longer, such as starting at time 712. In other examples, single sensor values may be similarly correlated, such as in cases where only one sensor input is used to detect anomalous data.

Figure 8:
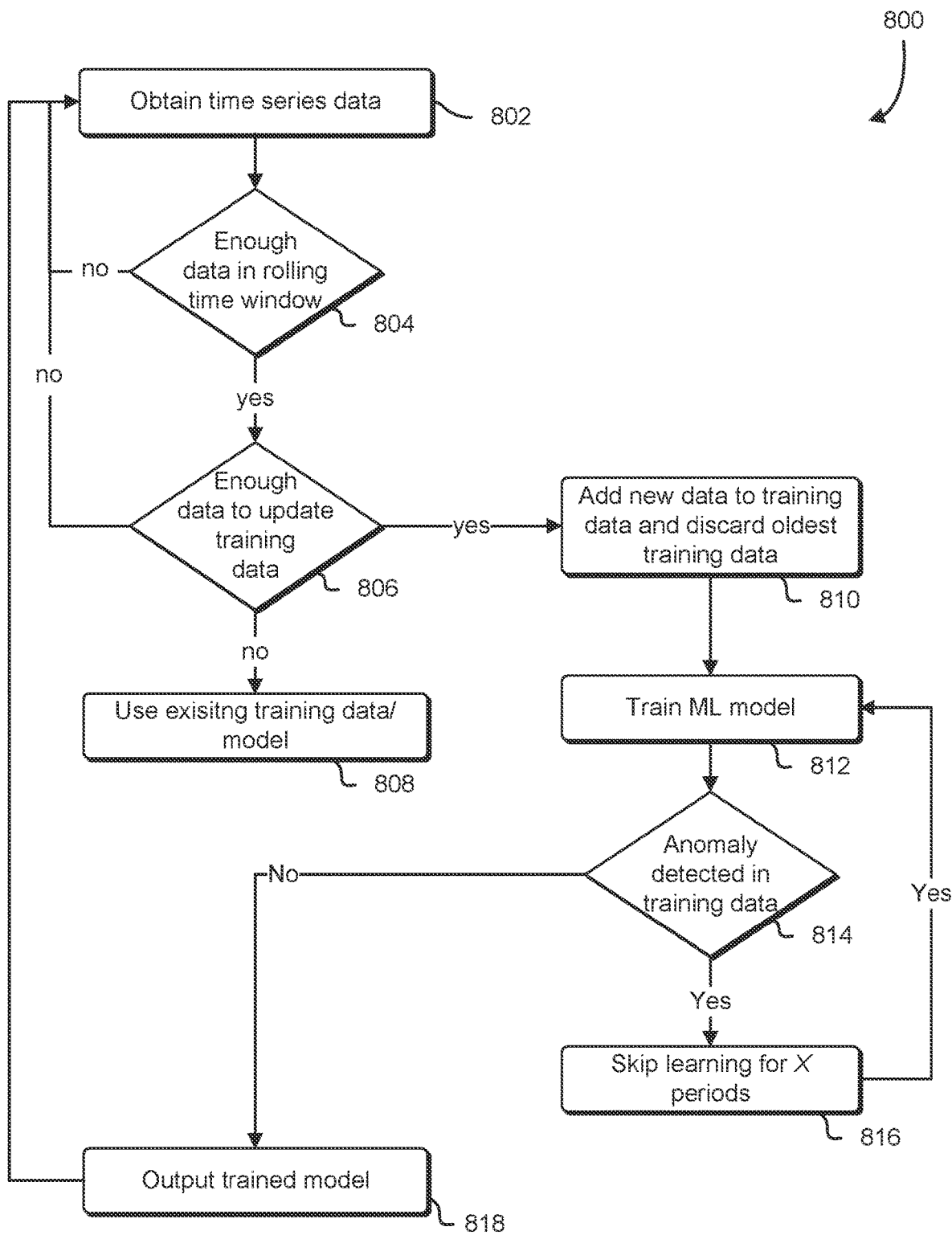
FIG. 8 illustrates an example process for apply skip learning to training a machine learning model, according to at least one embodiment.

FIG. 8 illustrates an example process 800 for training a machine learning model using skip learning, according to at least one embodiment. In some aspects, process 800 may be performed by the ML model training system 110, and/or the training data selector 112 and the skip learning process 116, described above in reference to FIG. 1, and/or may utilize aspects of processes 200, 300, 400 described above in reference to FIGS. 2-4.

Process 800 may begin at operation 802, in which time series data may be obtained. In some cases, the time series data may span a moving time period of a determined or predetermined (e.g., the same) length to be used as training data. The time series data may include values generated periodically within the moving time period, such as from one or more sensors or other data sources. At operation 804, it may be determined if there is enough data to fill a rolling time window, where the rolling time window may be the minimum amount of data to train an ML model. In some cases, the rolling time window may be a number of events or time steps, such as 256 time steps as described above. If there is not enough data, process 800 may continue to loop back to operation 802 and 804 until enough data is collected to train the model.

If there is enough data collected to fill threshold size of data to be processed (e.g., the rolling time window), process 800 may continue to operation 806, where it may be determined if there is enough data to update the training data. In some cases, operation 806 may include comparing the new data to threshold amount of data, such as 64 time steps or events, as described above. If there is not enough data, the existing training data/trained model may be sued in subsequent operations, at operation 808, such as for detecting anomalies via process 900. If here is enough training data to update the model, at operation 806, process 800 may proceed to operation 810, in which the new data (e.g., the window of data) may be added to the training data set, and the oldest window of data may be removed from the training data set. In some cases, operation 810 may include upon obtaining time series data spanning a first time window having a first length, adding the time series data spanning the first length time window to the training data, and removing other time series data spanning a second time window having the first length at the beginning of the moving time period.

Using the newly updated training data set, one or more ML models (e.g., online ML models) may be trained, at operation 812, via the techniques described in greater detail above. As the training data is used to train the ML model, process 800 may search for anomalies within the training data, at operation 814. If an anomalous value or values are detected, the skip learning techniques described herein may be implemented, at operation 816, such as not inputting the training data into the model for a certain length of time, number of data points, etc. Once the configurable time period or number of data points has occurred, process 800 may loop back through back through operations 812, 814, and 816 until all the training data of the updated training data set has been processed, at which point the trained model may be output, at operation 818, which is then suitable for use in detecting anomalies in live data, such as may be carried out by process 900 described below in reference to FIG. 9.

In some cases, process 800 may include determining at least one threshold value that indicates the estimation of the anomalous value for the moving time period and comparing values of the training data to the at least one threshold value to detect the estimation of the anomalous value, at operation 814. In some cases, detecting an anomaly in the training data may include determining a rolling median absolute deviation for the time window and comparing at least one value of the at least two values for the first time period to the rolling median absolute deviation to detect the anomaly in the training data.

In some cases, the skip leaning technique performed at operation 816 may include upon detecting an estimation of an anomalous value in the time series data corresponding to a first time period, pausing input of additional values of the training data into the machine learning model, and resuming input of the additional values of the training data into the machine learning model based at least in part on detecting at least one non-anomalous value. In yest some examples, operation 816 may include resuming input of the additional values of the training data into the machine learning model based at least in part on detecting at least a number of non-anomalous or nominal values. In some cases, the number of non-anomalous values that upon detection, trigger resuming input of the additional values of training data into the machine learning model may be modified based on feedback from the machine learning model.

Figure 9:
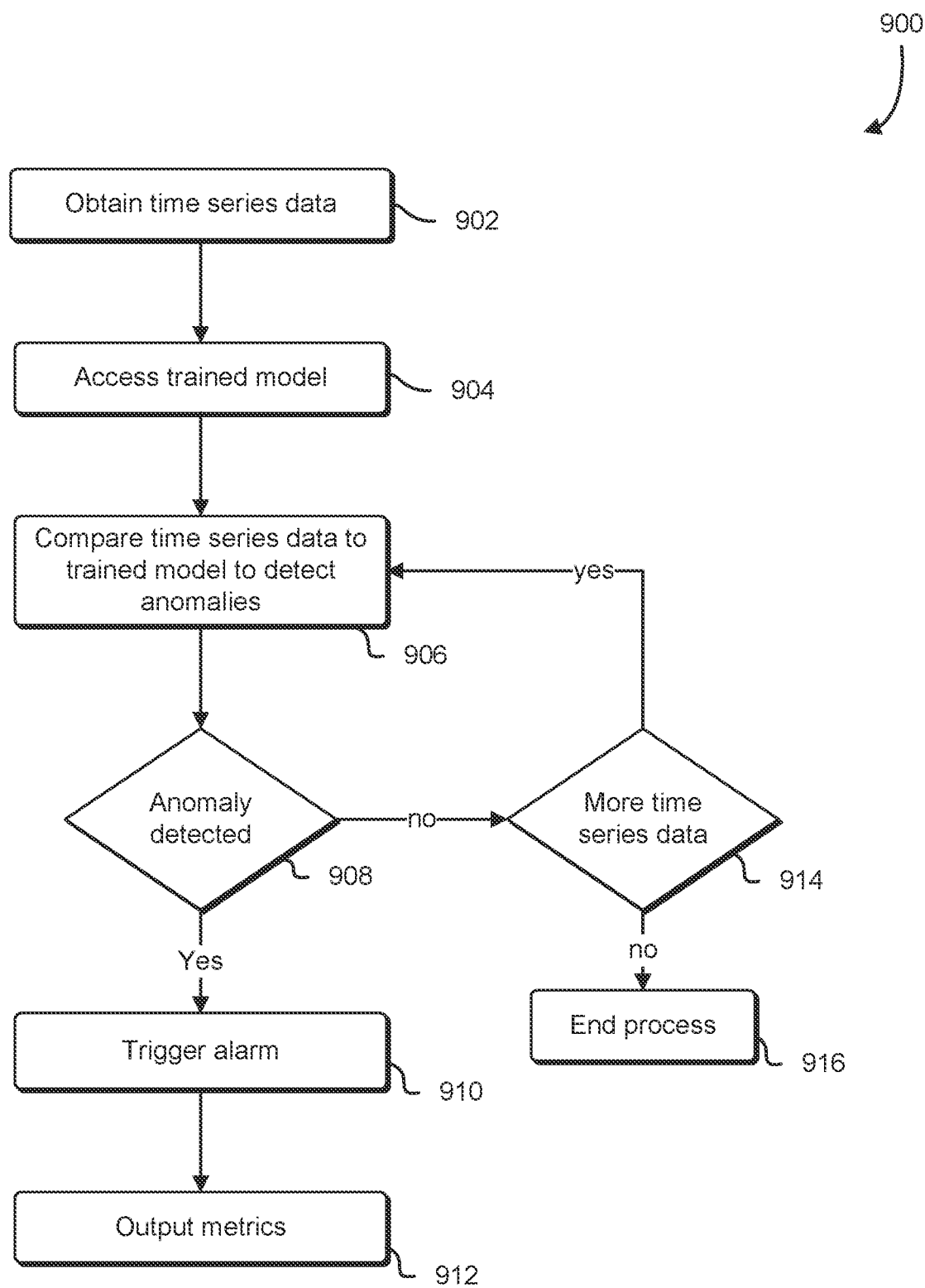
FIG. 9 illustrates an example process for using a machine learning model to detect anomalies in time series data, according to at least one embodiment.

FIG. 9 illustrates an example process 900 for using a trained model, such as the model trained by process 800, to detect anomalies in time series data. according to at least one embodiment. In some aspects, process 900 may be performed by the ML model training system 110, and/or the training data selector 112 and the skip learning process 116, and/or the anomaly detection service 118, as described above in reference to FIG. 1, and/or may utilize aspects of processes 200, 300, 400 described above in reference to FIGS. 2-4.

Process 900 may begin at operation 902, in which time series data may be obtained, such as a new event or time step (e.g., which may include 1 minute of new data from one or more sensors or other data source). Next, a trained model, such as a trained online ML model trained by process 800 described above, may be obtained and/or accessed, at operation 904. The time series data recently obtained may be compared or input into the ML model, at operation 904, to be used to detect anomalies that may be present in the time series data, at operation 906. If an anomaly is detected in the new data, at operation 908, an alarm may be triggered, at operation 910, and in some cases, metrics or other data or metadata concerning the anomaly may additionally be output, at operation 912.

If no anomaly is detected at 908, process 900 may select additional time series data, at operation 914, if available, and continue to loop through operations 906, 908, and 914, until an anomaly is detected and an alarm triggered, or until no more data is available, at which point process 900 may at end at operation 916. In some cases, an anomaly may be defined in a number of different ways and include combinations of values, where each value may be compared to a different threshold. In some cases, wherein an anomaly may be defined a combination of values from the at least two sensors or the data sources. In some cases, this may include associating a first weight with a first variable of at least two different variables that are obtained in the time series data, and a second weight with a second variable of at least two different variables that are obtained in the time series data. In this example, determining that an anomaly has occurred may be based on combining the values of the at least two variables using the first weight and the second weight.

Figure 10:
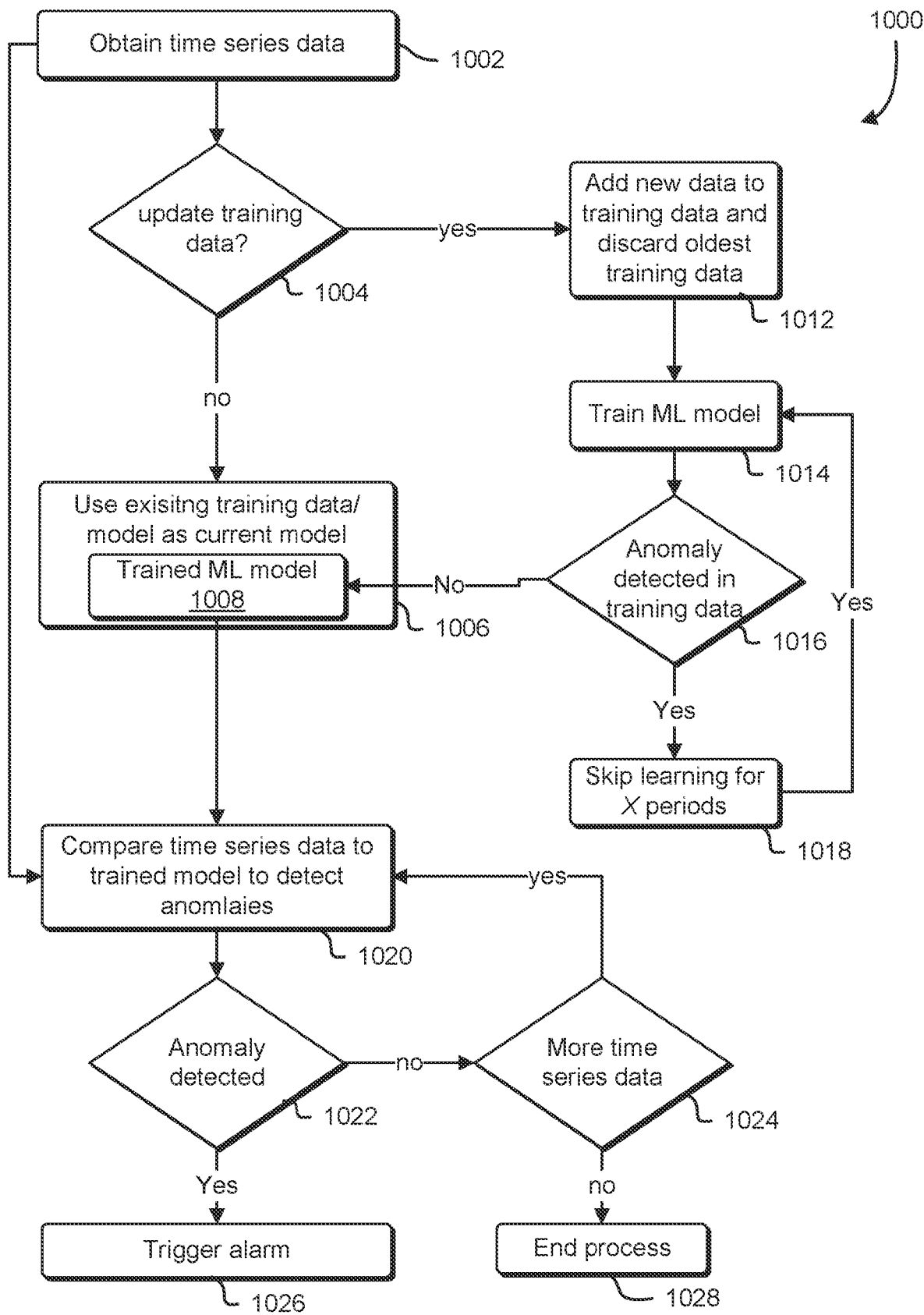
FIG. 10 illustrates an example process for training a machine learning model and using the machine learning model to detect anomalies, according to at least one embodiment.

FIG. 10 illustrates an example process 900 for training an ML model and using the trained ML model to detect anomalies in time series data, according to at least one embodiment. In some aspects, process 1000 may be performed by the ML model training system 110, and/or the training data selector 112 and the skip learning process 116, and/or the anomaly detection service 118, described above in reference to FIG. 1, and/or may utilize aspects of processes 200, 300, 400 described above in reference to FIGS. 2-4. Process 1000 may include one or more similar operations as described above in reference to processes 800 and 900; for the sake of brevity, similar operations will not be described in great detail below.

Process 1000 may begin at operation 10002, in which time series data may be obtained. Next, at operation 1004, it may be determined if the training data should be updated, for training one or more online ML models for use in anomaly detection. Operation 1004 may include comparing new time series data obtained at operation 1002 to one or more thresholds to determine if updating one or more ML models is warranted. If the determination at operation 1004 is no, then the existing training data/already trained model may be used at operation 1006, such that the current trained model 1008 may be set as the existing model. If there is enough training data to warrant updating the training data, at operation 1004, process 10000 may proceed to operation 1012, in which new data may be added to the set of training data, and/or old data removed from the set of training data. The online ML model, which may include an isolation forest ML online ML model, may be trained, suing the described skip learning techniques, at operations 1014, 1016, 1018, whereby the trained model may be set as the current training model 1008 to use for anomaly detection.

Using the online ML model 1008, the time series data obtained at 1002 may be compared/input into the ML model at operation 1020. The time series data may be processed through operations 1022, 1024, until either an anomaly is detected, such that an alarm may be triggered at operation 1026, or no new data is available to analyze, at which point process 1000 may end at operation 1028.

Figure 11:
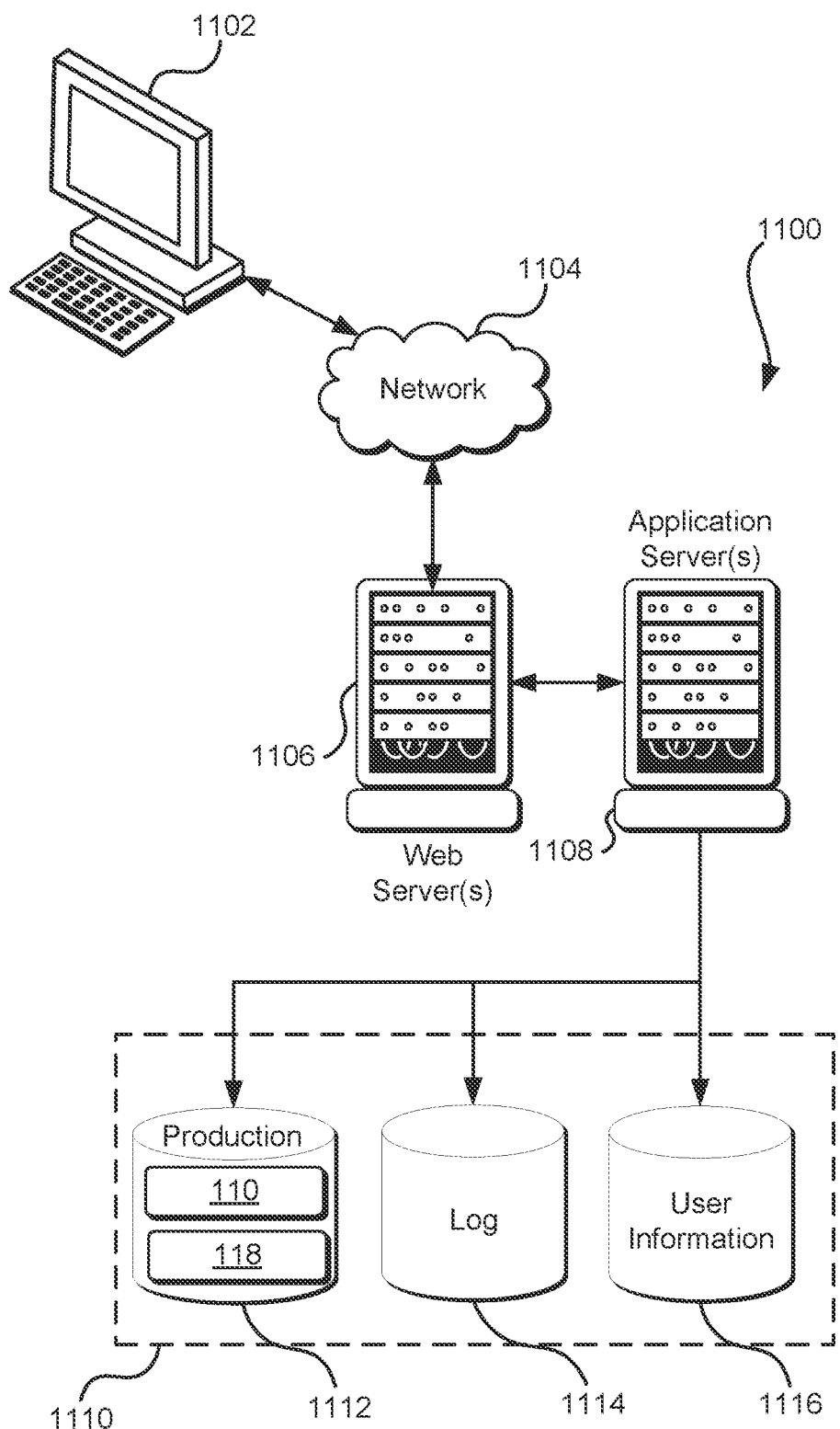
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1102 and the application server 1108, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1111 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto, and the application server 1108 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with this example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

In some examples, the application server(s) 1108 may host a model training system or service, such as system 110 and/or anomaly detection service, such as service 118 as described above. The model training service 110 and the anomaly detection service 118 may obtain data from data source 120, which may be store or obtained from data store 1010. In other cases, data source 110, 211 may originate or be obtained other services, such as hosted by application server(s) 1108.

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java©, C, C#or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method for detecting anomalies in time series data, comprising:
    obtaining time series data spanning a moving time period to be used as training data, the time series data comprising values from at least one sensor or data source generated periodically for the moving time period, wherein the moving time period comprises at least a first time window associated with a first portion of time series data and a second time window associated with a second portion of time series data, wherein the first time window and the second time window individually comprise a length of time;
    upon obtaining a third portion of time series data spanning the length of time and associated with a third time window, adding the third portion of time series data associated with the third time window to the training data and removing the first portion of time series data associated with the first time window corresponding to a beginning of the moving time period;
    training an isolation forest machine learning model using the training data to identify anomalies in the time series data, wherein training the isolation forest machine learning model comprises:
        detecting an anomaly in the time series data corresponding to a first time period;
        pausing training the isolation forest machine learning model by not entering additional values corresponding to a number of periods after the first time period into the isolation forest machine learning model; and
        resuming training the isolation forest machine learning model by entering additional values corresponding to at least one period after the number of periods has elapsed; and
    obtaining a fourth portion of time series data spanning the length of time and associated with a fourth time window; and
    using the trained isolation forest machine learning model to detect anomalies in the fourth portion of time series data.

2. The computer-implemented method of claim 1, wherein detecting the anomaly in the time series data corresponding to the first time period for training the isolation forest machine learning model further comprises:
    determining a rolling median absolute deviation for at least one of the second or third time window;
    comparing at least one value of at least two values for the first time period to the rolling median absolute deviation to detect the anomaly in the training data.

3. The computer-implemented method of claim 1, wherein the anomalies are defined by a combination of values from at least two sensors of the at least one sensor or at least two data sources of the at least one data source.

4. The computer-implemented method of claim 3, further comprising: associating a first weight to a first set of values from a first sensor of the at least two sensors and a second weight to a second set of values from a second sensor of the at least two sensors, and wherein the anomalies are defined by a combination of the first set of values and the first weight and the second set of values and the second weight.

5. The computer-implemented method of claim 1, wherein:
    the values from at least two different sensors or data sources generated periodically for the moving time period comprise temperature values relating to computing devices of a data center, and
    training the isolation forest machine learning model using the training data to identify the anomalies in the time series data comprises training the isolation forest machine learning model to detect heat events that are likely to cause damage to at least one of the computing devices, and
    the method further comprises triggering an alarm when an anomaly is detected.

6. A system, comprising:
    one or more processors; and
    memory that stores computer-executable instructions that, if executed, cause the one or more processors to:
        obtain time series data spanning a moving time period of a set length to be used as training data, the time series data comprising values generated periodically within the moving time period;
        train a machine learning model using the training data to identify anomalies in the time series data by:
            upon detecting an estimation of an anomalous value in the time series data corresponding to a first time period, pausing input of additional values of the training data into the machine learning model; and
            resuming input of the additional values of the training data into the machine learning model based at least in part on detecting at least one non-anomalous value;
        obtain at least one additional value from additional time series data; and use the trained machine learning model to detect a first anomaly in the additional time series data by comparing the at least one additional value to the trained machine learning model.

7. The system of claim 6, wherein the memory stores additional computer-executable instructions that, if executed, cause the one or more processors to:
upon obtaining time series data spanning a first time window having a first length, adding the time series data spanning the first length time window to the training data, and removing other time series data spanning a second time window having the first length at the beginning of the moving time period.

8. The system of claim 6, wherein the memory stores additional computer-executable instructions that, if executed, cause the one or more processors to:
determine at least one threshold value that indicates the estimation of the anomalous value for the moving time period; and
compare values of the training data to the at least one threshold value to detect the estimation of the anomalous value.

9. The system of claim 8, wherein the instructions that, if executed, cause the one or more processors to determine at least one threshold value that indicates an anomaly for the moving time period further comprise instructions, if executed, cause the one or more processors to:
determine rolling median absolute deviation for the moving time window.

10. The system of claim 6, wherein the instructions that, if executed, cause the one or more processors to resuming input of the additional values of the training data into the machine learning model based at least in part on detecting at least one non-anomalous value further comprise instructions, if executed, cause the one or more processors to:
resuming input of the additional values of the training data into the machine learning model based at least in part on detecting at least a number of non-anomalous values.

11. The system of claim 10, wherein the memory stores additional computer-executable instructions that, if executed, cause the one or more processors to:
modify the number of non-anomalous values that upon detection, trigger resuming input of the additional values of training data into the machine learning model based on feedback from the machine learning model.

12. The system of claim 6, wherein the values of the time series data comprise values for at least two different variables, and wherein the memory stores additional computer-executable instructions that, if executed, cause the one or more processors to:
associate a first weight with a first variable of the at least two different variables and a second weight with a second variable of the at least two different variables;
determine that the first anomaly has occurred based on combining the values of the at least two different variables using the first weight and the second weight.

13. The system of claim 6, wherein the memory stores additional computer-executable instructions that, if executed, cause the one or more processors to:
trigger an alarm based on detecting the first anomaly in the additional time series data.

14. The system of claim 6, wherein the machine learning model comprises at least one of an isolation forest machine learning model or a tree-based ensemble machine learning model.

15. A non-transitory computer-readable storage medium storing thereon executable instructions that, as a result of being executed by one or more processors of a computer system, cause the computer system to at least:
obtain time series data spanning a time window of a determined length to be used as training data, the time series data comprising values generated periodically for the time window;
train a machine learning model using the training data to identify anomalies in the time series data by:
upon detecting an estimation of an anomalous value in the time series data corresponding to a first time period of the time window, pausing input of additional values of the training data into the machine learning model; and
resuming input of the additional values of the training data into the machine learning model based at least in part a triggering event;
obtain at least one additional value from additional time series data; and
use the trained machine learning model to detect a first anomaly in the additional time series data by comparing the at least one additional value to the trained machine learning model.

16. The non-transitory computer-readable storage medium of claim 15, wherein the instructions comprising additional instructions, that cause the computer system to:
upon obtaining a first length of additional time series data:
add the first length of additional time series data to the training data; and
remove a portion of time series data spanning the first length from the beginning of the time window.

17. The non-transitory computer-readable storage medium of claim 15, wherein the triggering event comprises detecting at least a number of nominal values.

18. The non-transitory computer-readable storage medium of claim 15, wherein the instructions comprising additional instructions, that cause the computer system to:
determine at least one threshold value that indicates the estimation of the anomalous value for the first time period; and
compare values of the training data to the at least one threshold value to detect the estimation of the anomalous value.

19. The non-transitory computer-readable storage medium of claim 15, wherein the values of the time series data comprise values for at least two different variables, and wherein the instructions comprising additional instructions, that cause the computer system to:
associate a first weight with a first variable of the at least two different variables and a second weight with a second variable of the at least two different variables;
determine that the first anomaly has occurred based on combining the values of the at least two variables using the first weight and the second weight.

20. The non-transitory computer-readable storage medium of claim 15, wherein the machine learning model comprises a tree-based machine learning model.

* * * * *